United States Patent
Presley et al.

(10) Patent No.: US 7,667,872 B2
(45) Date of Patent: Feb. 23, 2010

(54) GAMUT MAPPING AND RENDERING INTENT MANAGEMENT SYSTEM

(75) Inventors: Anthony Presley, Bellevue, WA (US); Jeff Bloomfield, Bothell, WA (US); Marilyn Chen, Atherton, CA (US); Michael Stokes, Eagle, ID (US)

(73) Assignee: Microsoft Corporation, Redmond, WA (US)

( * ) Notice: Subject to any disclaimer, the term of this patent is extended or adjusted under 35 U.S.C. 154(b) by 876 days.

(21) Appl. No.: 11/273,155

(22) Filed: Nov. 14, 2005

(65) Prior Publication Data

US 2007/0109565 A1    May 17, 2007

(51) Int. Cl.
  *G06F 15/00* (2006.01)
(52) U.S. Cl. .......................................... 358/1.9; 358/2.1
(58) Field of Classification Search .................. 358/1.9, 358/2.1
See application file for complete search history.

(56) References Cited

U.S. PATENT DOCUMENTS

| 5,815,642 | A | * | 9/1998 | Kumada ...................... 358/1.9 |
| 6,075,888 | A | | 6/2000 | Schwartz |
| 6,603,879 | B2 | | 8/2003 | Haikin et al. |
| 7,080,058 | B1 | | 7/2006 | Upadhyayula et al. |
| 2005/0237547 | A1 | | 10/2005 | Ito et al. |
| 2007/0052985 | A1 | * | 3/2007 | Presley et al. ................. 358/1.9 |
| 2007/0083874 | A1 | * | 4/2007 | Vasudevan et al. .......... 719/328 |

* cited by examiner

*Primary Examiner*—Twyler L Haskins
*Assistant Examiner*—Michael Burleson
(74) *Attorney, Agent, or Firm*—Shook, Hardy & Bacon, LLP (57) ABSTRACT

A system and method for selectively setting gamut map model defaults in a color management system is disclosed for transforming colors from a first color space to a second color space. The method includes the steps of comprises determining the profile associated with the second color space from one of an ICC profile, a device model profile and a system default profile; associating a color appearance profile and a gamut mapping profile based on the profile; and selecting at least one of the color appearance and gamut mapping profiles based on the profile associated with the second color space.

17 Claims, 4 Drawing Sheets

GAMUT MAPPING AND RENDERING INTENT MANAGEMENT SYSTEM

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates to a color management system for a computer. More particularly, the present invention relates to a color management system that enables the query and specification of the color profiles being used at different stages of the color processing model to manage color output of various peripheral devices with diverse color characteristics.

BACKGROUND OF THE INVENTION

Numerous color management solutions have been introduced in an effort to obtain color consistency across different software applications and imaging devices. However, none of these solutions and standards has yet been successful in satisfying all the needs of the vast majority of new and existing digital imaging users.

Color is a result of interactions between light sources, physical objects, and the human visual system. The color management challenge begins with modeling the complex and variable nature of these physical and psychological effects. Further, each device, whether a scanner, monitor, or printer, has a particular range of colors that it is capable of producing, known as the device gamut. The gamut of a device is determined by the physical characteristics of the device itself, as well as the ambient lighting. In today's open computing environment, constraints are imposed by the differing capabilities and proprietary technologies in devices, applications, operating systems, and networks. For example, the gamuts of devices of the same types may vary. For instance, the gamuts of scanners depend on the technology used (flatbed, drum, charge-coupled device) as well as the media scanned (reflective vs. transparent). With monitors, the gamut depends on the composition of the phosphors. With printers, the gamut varies depending on the inks and media used.

Given the current available tools, matching colors across devices and workflows is not an easy task. Current color management solutions tend to be difficult to use as operating systems, applications, and device drivers often implement color management in proprietary, inconsistent, and conflicting ways.

Troubleshooting color problems likewise is complicated and obscure for all but the most knowledgeable user. Device calibration is often slow and difficult. Practically, this means that a significant amount of color expertise is required to produce the most basic results. Because most end users cannot precisely articulate their needs, there is a lack of understanding of what is required at the architectural or technical level to reproduce consistent color results on day-to-day basis.

The quest for consistent color is not a new phenomenon. In 1994, the International Color Consortium (ICC) was established for the purpose of creating, promoting and encouraging the standardization and evolution of an open, vendor-neutral, cross-platform color management system architecture and components. The outcome of this cooperation was the development of the ICC profile specification.

The intent of the ICC profile format was to provide a cross-platform device profile format that could be used to translate color data created on one device into another device's native color space. The general idea was that acceptance of this format by operating system vendors would allow end users to transparently move profiles and images with embedded profiles among different operating systems and applications and allow device manufacturers to create a single profile for multiple operating systems.

Color management systems today provide very little flexibility in controlling preferred rendering intent. Rendering intent typically controls the gamut map model and parameters involved in subjectively transforming the media content from the color gamut capabilities of done today to different capabilities of a second device. Historically two approaches have been taken. The intrinsic device or application approach processes all of the rendering intent or gamut mapping within the vendor's device of application. This is what happens with standard color space workflows (sRGB). The application might optionally provide some proprietary rudimentary control such as a digital still camera providing sRGB-I and sRBG-II. The second approach is to provide a rudimentary flag to give a "hint" for which gamut mapping algorithm should be used. This approach is taken by PostScript, PDF and ICC workflows. The flag might be a simple enumeration of four values that have little documented meaning, such as saturation, perceptual, absolute calorimetric and relative colormetric.

Neither of these prevalent approaches provides for the opportunity for hardware vendors to optimize the look and feel of their devices by default in such a manner that end users and applications reasonably can determine whether to override the defaults or provide different defaults. The ICC-type solution results in a series of rendering intent conflicts between devices, applications and users. The conflicts tend to be resolved in an ad-hoc manner. This results in significant frustration and confusion by end users and vendors on what color management processing will actually be accomplished under each set of conditions.

SUMMARY OF THE INVENTION

The present invention is directed to a system and method for selectively setting gamut map model defaults in a color management system that transforms colors from a first color space to a second color space. The method comprises determining the profile associated with the second color space from one of an ICC profile and a device model profile; associating a color appearance profile and a gamut mapping profile based on the profile; and selecting at least one of the color appearance and gamut mapping profiles based on the profile associated with the second color space.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides a color management system for selectively setting rendering intent and gamut map model defaults. The management system enables the query and specification of which profiles are used at different stages of the color processing model to manage color output of various peripheral devices with diverse color characteristics. The color management system thus provides improvements in the manageability and transparency of color management while maintaining legacy compatibility.

Figure 7:
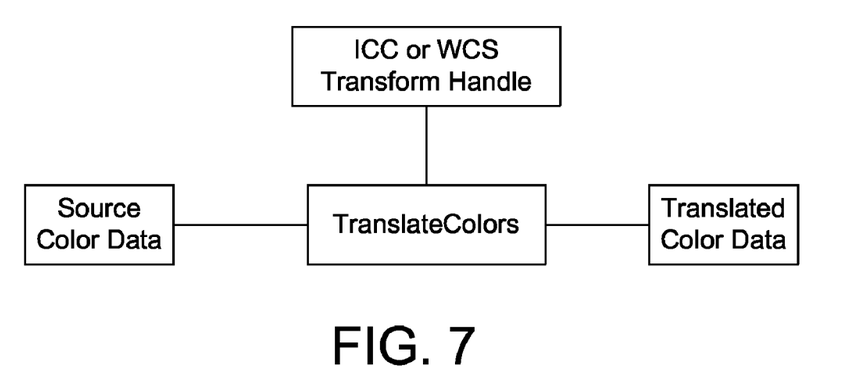
FIG. 7 is a schematic diagram of the system of the present invention.

In order to provide this functionality, the management system 10 provides three XML-based color profile formats: the color device model profile (DMP) 12, the color appearance model profile 14 (CAMP), and the color gamut map model profile (GMMP) 16. These profiles contain information used by color processing algorithms to translate color between different color spaces.

Figure 1:
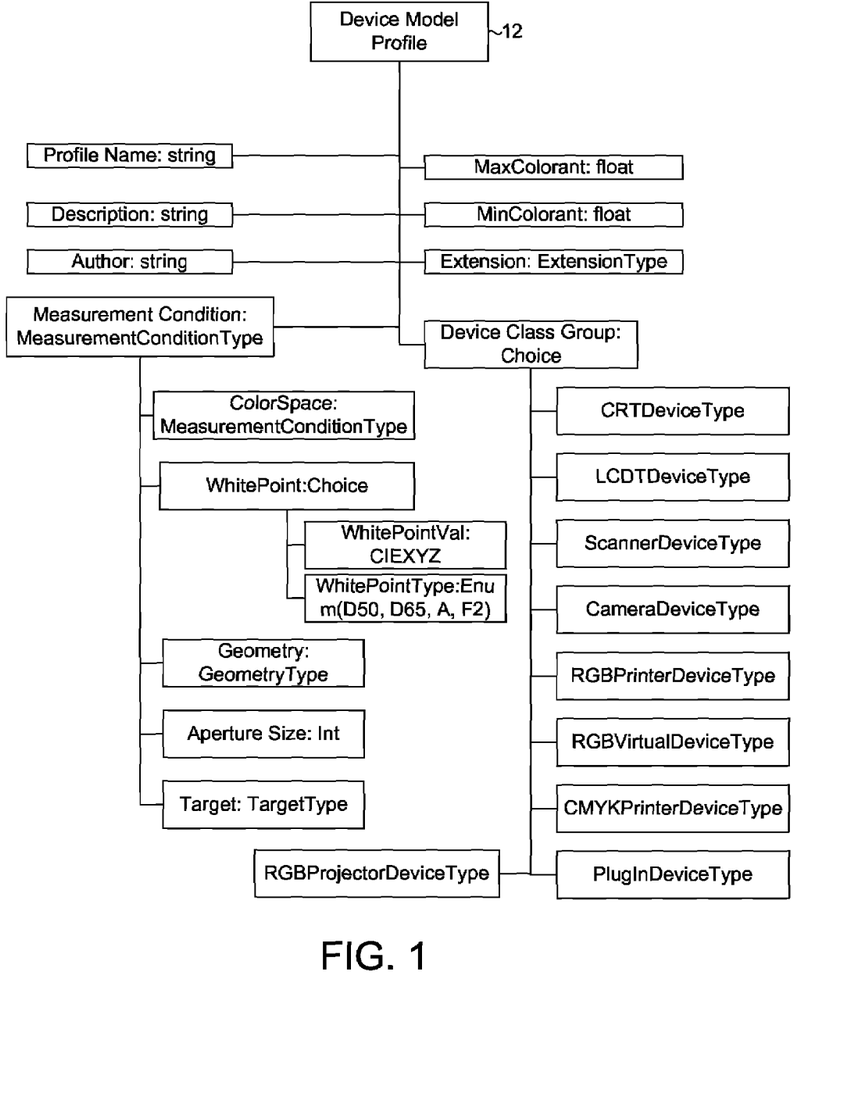
FIG. 1 is a schematic diagram of the device model profile architecture.

DMP 12 is an XML-based file format that contains measurements required to describe the relationship between the native color device space values and CIEXYZ values (i.e., the X, Y, and Z coordinates of a specific color in a specified color space for display or printer). It is to be understood that the DMP 12 may contain spectral data or alternative human visual color space, such as CIELUV FIG. 1 shows the DMP 12 architecture. The DMP schema consists of the sampling measurement data and provides support for basic color measurement targets, focusing on common standard targets and targets optimized for the baseline device models. These values are viewing-condition dependent and may be based on CIE 1931 two-degree observer recommendations. It is to be understood that other observers, such as ten-degree observers may be used without departing from the scope of the present invention. Common standard targets include various versions of IT8 and GretagMacbeth ColorChecker targets.

CEXYZ assumes a measured light source. Thus, this white point measurement information must be included with the device profile and validated during the transform creation process with color appearance white point viewing condition values contained in the relevant CAMP 14. If there is a mismatch, the color appearance model is initialized using the DMP's light source white point and all the parameters as found in the CAMP. Other measurement specific parameters such as geometry have default values with optional explicit parameters. It is to be understood that the use of spectral data instead of CIEXYZ removes the possibility of a mismatch.

In addition, the device profile provides explicit information on the targeted device model as well as a policy on what baseline fallback device model to use if the targeted model is unavailable. The profile instances can include private extensions using standard XML extension mechanisms.

Figure 2:
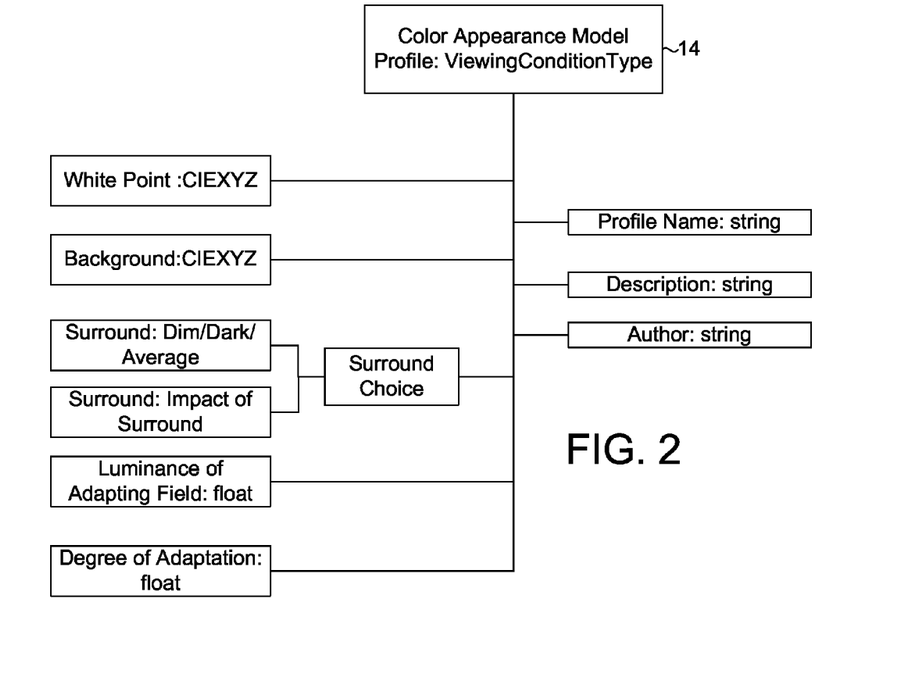
FIG. 2 is a schematic diagram of the color appearance model profile architecture.

CAMP 14 likewise is an XML-based file format. It contains viewing conditions required to describe the relationship between the DMP's CIEXYZ values and the CIEJab values. The CAMP 14 is composed of XML tags to provide parametric values to the CIECAM02 baseline color appearance model variables. Details on ranges for parameters are provided in the baseline color appearance model specification and CIECAM02 recommendation. FIG. 2 shows the architecture for CAMP 14. It is to be understood that other color appearance spaces may be used without departing from the scope of the present invention.

GMMP 16 is also an XML-based filed format that controls the mapping of colors between source and destination device gamuts. GMMPs are a generalization of ICC rendering intents. There are three possible sources of rendering intents: the "source" profile (SP), the "destination" profile (DP), and the intent list parameter in CreateMultiProfile Transform.

Figure 3:
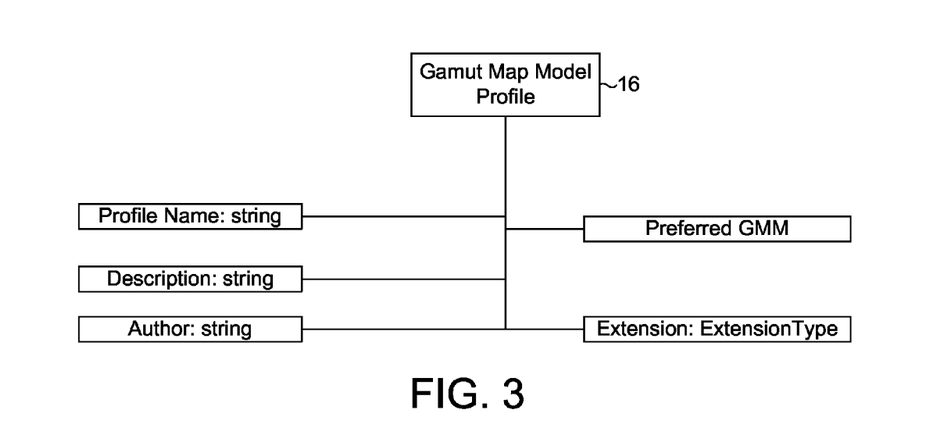
FIG. 3 is a schematic diagram of the color gamut map model profile architecture.
Figure 4:
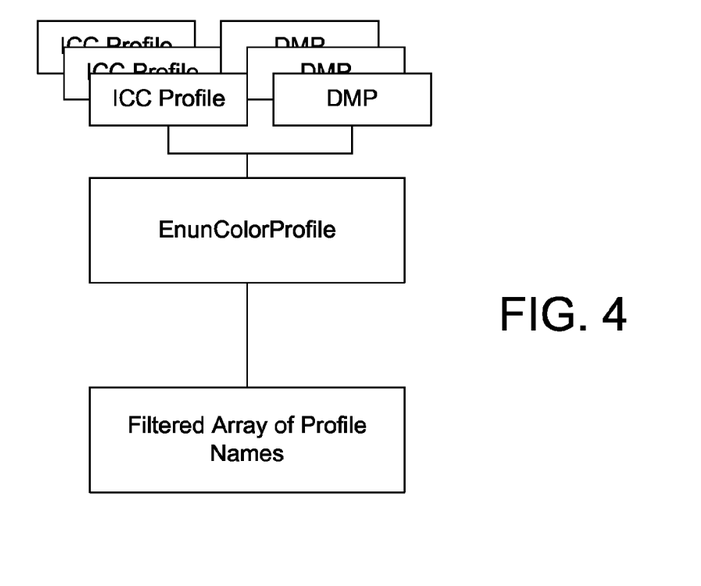
FIG. 4 is a schematic diagram of the EnunColorProfile function of the present invention.

The basic GMMP 16 schema consists of common header information, an optional reference to a preferred Gamut Map Model plug-in and extension tags. In addition, the GMMP 16 provides explicit information on the targeted gamut map model and a policy on what baseline fallback Gamut Map Model to use if the targeted model is unavailable. An exemplary architecture for the GMMP is shown in FIG. 3. The gamut boundaries are described in the CIEJab device and are viewing-condition independent values.

The color management system enables profile association with devices, default profile settings and enumeration of profiles in both per-user and system-wide scope. There are two basic functions that support intent or gamut map model choices: OpenColorProfile; and CreateMultiColorProfile-Transform.

The OpenColorProfile function creates a handle for a specified color profile. The Windows Color System (Wcs) profile filename extensions are ".cdmp" for DMPs, ".camp" for CAMPs and ".gmmp" for GMMPs. For the Wcs, a valid profile handle (HPROFILE) is a composition of a DMP, CAMP and GMMP. It is derived from a DMP by acquiring the default CAMP and default GMMP from the registry. The default GMMP may be set to DEFER_UNTIL_RUNTIME instead of a valid GMMP, if desired. The DEFER_UNTIL_RUNTIME value is used by the CreateMultiProfile Transform and CreateColor Transform APIs to defer the GMMP rendering intent until transform creation time when all of the GMMPs and rendering intents are available to select.

Figure 5:
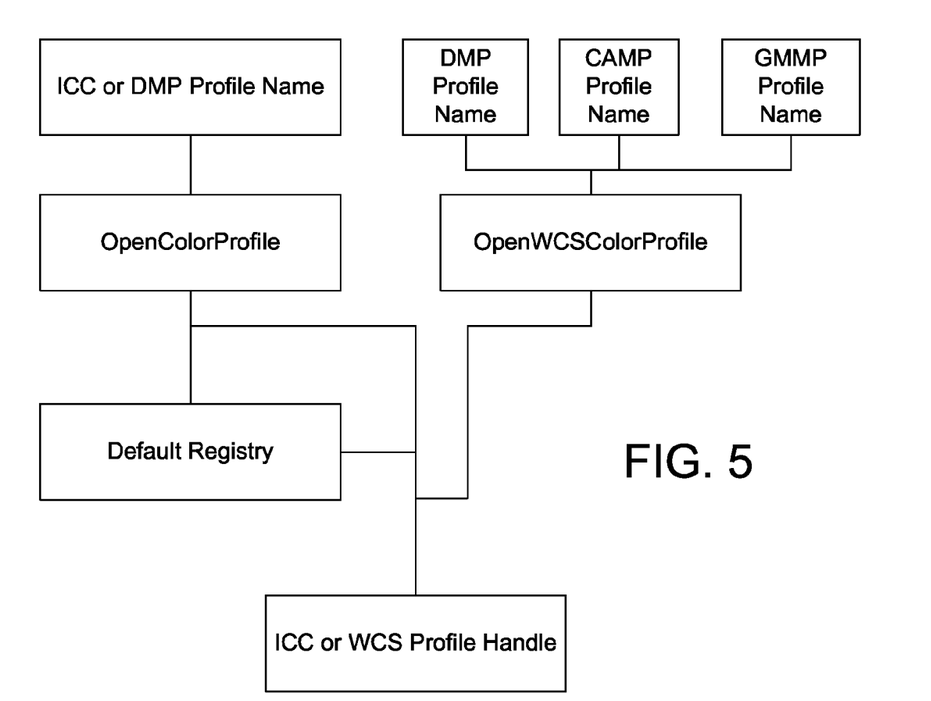
FIG. 5 is a schematic diagram of the OpenColorProfile function of the present invention.

As shown in FIG. 5, the OpenColorProfile function supports both WCS and ICC profile handles. If only ICC profiles are used to create the transform, the legacy translation engine, such as, for example, ICM2, is used. DMP WCS profiles used with OpenColorProfile return valid WCS profile handles and combinations of DMP, CAMP and GMMP WCS profiles return valid profile handles.

If two WCS profile handles are used in a transform, the source profile GMMP has precedence. As discussed, when DMP profiles are used with OpenColorProfile function, the default CAMP and GMMP are obtained from the registry. If the default WCS profile is invalid due to not being set, then a calling function will fail.

For ICC and the WCS profiles, a CAMP and GMMP are provided by the OpenColorProfile function based on the current default CAMP and GMMP in the registry. Once the handle to the color profile is created, any information used to create that handle can be deleted.

Figure 6:
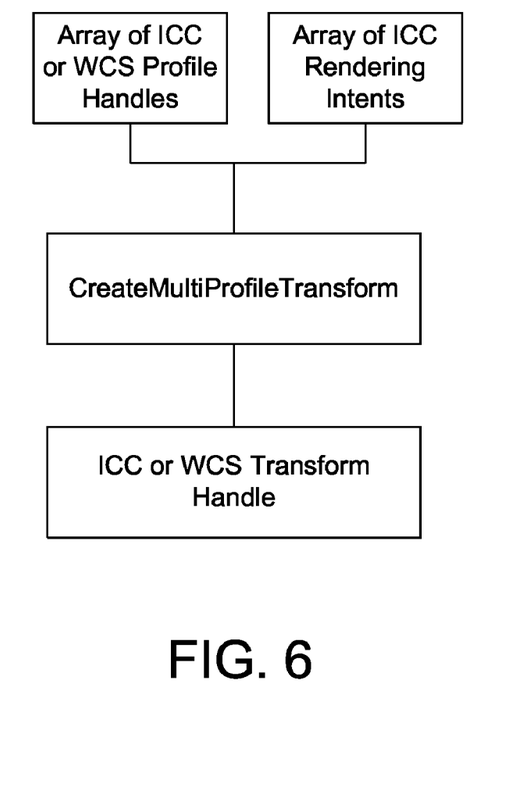
FIG. 6 is a schematic diagram of the CreateMultiProfile function of the present invention.

As shown in FIG. 5, the CreateMultiProfile Transform function accepts an array of profiles or a single device link profile and creates a color transform that applications can use to perform color mapping. It determines whether the HPROFILEs contains ICC or WCS profile information and handles them appropriately.

The ICM2 CreateColor Transform creates a color transform that applications can use to perform color management. This function creates a color context from the LOGCOLOR- SPACE and intent inputs. The intents are mapped to baseline ICC gamut mapping algorithm correlates. The function then calls ICM2 function CreateMultiProfile Transform for consistent color processing. The CreateColor Transform is a relatively simple function that mostly copies data into the internal optimized transform structure.

The CreateMultiProfile Transform function accepts an array of profiles and an array of intents or a single device link profile and creates a color transform that applications can use to perform color mapping. It processes those input profiles and intents to create device models, color appearance models, gamut boundary descriptions, and gamut mapping models. The optimized transform method creates a single, optimized table in which source colors are indexed into the table and interpolated to provide resulting destination colors.

This is accomplished by initializing device models directly from DM profiles. There will be one device model created for each profile in the call to Create MultiProfile Transform. Color appearance models are initialized directly from CAM profiles. There should be one CAM profile for each profile in the call to Create MultiProfile Transform. Gamut boundary descriptions are initialized from a device model object and a CAM object. There should be one gamut boundary description for each profile in the call to CreateMultiProfileTransform. Gamut mapping models are initialized from two gamut boundaries and an intent. A gamut mapping model is created between each pair of device models created from the call to Create MultiProfile Transform. Note that this means that one fewer gamut map model is needed than device models. Likewise, because the number of intents matches the number of device models, there is an additional intent than needed. Thus, the first intent in the list is skipped. The list of device models and intents are read and the system creates gamut mapping models. The system selects the first and second device model and the second intent and initializes the first gamut mapping model. Then, the system selects the second and third device model and the third intent and initializes the second gamut mapping model. This process is continued until all the gamut mapping models are created. When these profiles have been properly processed and all intermediate objects have been created and initialized, the system can create the Wcs Color transformation transform.

The color management system of the present invention provides several approaches to setting rendering intents or gamut map models and their defaults. The first approach is to completely resolve rendering intents and GMMPs at the OpenColorProfile function. If OpenColorProfile is provided a DMP, a default CAMP and GMMP is provided to the HPROFILE using GetDefaultColorProfile. If the OpenColorProfile is given a NULL for either CAMP or GMMP, then GetDefaultColorProfile is called to replace that NULL with a valid profile when creating the HPROFILE. If the HPROFILE is a Wcs profile and not an ICC profile, the rendering intent array values are ignored in the CreateMultiColorProfile Transform. The rendering intents are only valid with ICC profiles in CreateMultiColorProfile Transform. This approach is relatively simple and provides for default profiles to be used and explicit CAMP and GMMPs to be set.

A second approach is to resolve rendering intents and GMMPs at the transform creation. In this approach, the OpenColorProfile will be the Wcs OpenColorProfile if the CAMP and GMMP are set to NULL. Thus, the HPROFILE has a DMP, but no CAMP or GMMP. When creating the transform, the system calls Wcs GetDefaultColorProfile for default CAMP and GMMP. A new HPROFILE is created, which is the previous HPROFILE plus the default CAMP and GMMP. The defaults are obtained as follows: first get default per device, if it fails, get default per system, if it fails, get hard-coded baseline. If it is an ICC profile and baselines are not set, a hardcoded baseline is obtained. If an independent vendor wants the system to use a specified CAMP and GMMPs, Wcs OpenProfile must be called.

A third approach is to dynamically resolve rendering intents and GMMPs. Some are resolved at OpenColorProfile and some are resolved at CreateTransform. Pure ICC profiles will not work to activate the color management system of the present invention. Thus, these profiles are resolved at OpenColorProfile. And, if the device has a DMP profile for OpenColorProfile and returns a valid profile handle as described above, this GMMP is resolved at OpenColorProfile. However, if the Wcs profile fails due to not being set by SetDefaultProfile function, then the GMMP is resolved at Create transform.

For the fourth approach, in order to provide GMMP usage when converting from a source Wcs profile to a destination ICC profile, a default ICC PCS system CAMP and a GMMP selection needs to be associated in our ICC-profile handle definition for use in the Wcs Cite/Create MultiProfile Transform function. These are ignored when processing "pure" ICC profiles through legacy code. This insures that embedded CAMP and GMMP profile selection always occurs at OpenColorProfile for all circumstances and not at CreateMultiProfileTransform. Non-embedded selection, by definition, occurs at transform time.

In order to provide GMMP usage when converting from a source Wcs profile to a destination ICC profile, a default ICC PCS system CAMP and a GMMP selection needs to be associated in our ICC-profile handle definition for use in the Wcs Cite/Create MultiProfile Transform function. These are ignored when processing "pure" ICC profiles through legacy code. This insures that embedded CAMP and GMMP profile selection always occurs at OpenColorProfile for all circumstances and not at CreateMultiProfileTransform. Non-embedded selection, by definition, occurs at transform time.

This leads to the following three changes. The PROFOBJ structure in icmpriv.w is changed in order to provide CAMP and GMMP support for legacy ICC profile objects. Further, an IccPcsV4.camp system default is created with setup installation and support in the manifest with file protection so it is always available. The WcsOpenColorProfile API is changed to set the IccPcsV4.camp and set the GMMP parameter based on the system default GMMP when an ICC is used as a DMP. Finally, the OpenColorProfile API is changed to set the IccPcsV4.camp and set the default GMMP parameter based on the internal ICC rendering intent in that profile.

In order to have a single system GMMP default that may be set by users and programmatically, support for a selection of which of the four default GMMP in the system default needs to be created. This is done as follows. COLORTYPE (and registry support) is set to allow for Wcs_GMMP_DEFAULT setting to effectively point to one of the four system default GMMPs (CPT_GMMP_ABSOLUTE_COLORIMETRIC, CPG_GMMP_RELATIVE _COLORIMETRIC, CPT_GMMP_PERCEPTUAL or CPT_GMMP_SATURATION); API support in Wcs GetDefaultColor Profile is set to retrieve the system default GMMP pointed to by the WCS_GMMP_DEFAULT registry; and API support for Wcs SetDefaultColor Profile sets the WCS_GMMP_DEFAULT registry to one of the four system default GMMPs by a NULL pInputProfileName and sets dwSCS parameter to one of the four system defaults. Source Profile and Destination Profile GMMPs support the four baseline/legacy rendering intents or a NULL value. These GMMPs optionally support plug-in Globally Unique Identifier (GUID) reference to a vendor supplied GMM.

Applications that do not change as well as ICC profiles will be using the intents 0-3 and will thus get the baseline GMMs. OpenColorProfile will insert default CAMP and GMMP. WcsOpenColorProfile will substitute default CAMP and GMMP for NULL parameters.

Independent hardware vendors can specify which GMM is used for their device. This is done by installing and associating GMMPs with their device and setting the default GMMPs. Wcs GetDefaultColor Profile is called to obtain the default GMMP for that device and then Wcs OpenColor Profile is called with that GMMP. Finally, Create MultiProfile Transform is called with that Wcs HPROFILE.

Rendering intents for ICC profiles are consistent with CreateMultiProfile usage. A plugin GMM is used if the GMMP contains a GUID referencing an available plugin GMM or the GMMP is used in one of the paths described above in Create MultiProfile Transform.

The color management system finds the default profile for the system or a device by specifying the profile class in the pEnumRecord parameter and optionally the device's name. When enumerating profiles associated with devices. the system returns the default profile last. Several profiles are typically associated with printers, based on the paper and ink types. There is a default for each device. For ICC profiles only, the graphic device interface (GDI) selects the best profile from the ICC associated profiles when the application creates a device context (DC).

If the dwFields member of the structure of type ENUMTYPE that is pointed to by the pEnumRecord parameter is set to ET_DEVICENAME, this function will enumerate all of the color profiles associated with all types of devices attached to the user's computer. If the dwFields member of the structure pointed to by the pEnumRecord parameter is set to ET_DEVICENAME |ET_DEVICECLASS and a device class is specified in the dwDeviceClass member of the structure, this function will only enumerate the profiles associated with the specified device class. If the dwFields member is set only to ET_DEVICECLASS, the EnumColorProfiles function will enumerate all profiles that can be associated with that type of device.

The system can use EnumColorProfiles to obtain the size of the buffer in which the profiles are enumerated. It should call the EnumColorProfiles function with the pBuffer parameter set to NULL. When the function returns, the pdwSize parameter will contain the required buffer size in bytes. Your program can use that information to allocate the enumeration buffer. It can then invoke EnumColorProfiles again with the pBuffer parameter set to the address of the buffer.

This function will provide the information for converting WCS specific DMP information to the legacy EnumType record in order to provide WCS DMP profile. The defaults will be the same as ICC if this information is not present.

What is claimed is:

1. A method for selectively setting gamut map model defaults in a color management system that transforms colors from a first color space to a second color space, the method comprising:
   determining a profile associated with the second color space from one of an ICC profile, a device model profile, and a system default profile;
   associating a color appearance profile and a gamut mapping profile based on the profile;
   selecting at least one of the color appearance and gamut mapping profiles based on the profile associated with the second color space;
   setting rendering intents and their defaults;
   processing input profiles and intents to create device models, color appearance models, gamut boundary descriptions, and gamut mapping models; and
   creating an interpolated index of source colors to provide resulting destination colors.

2. A method according to claim 1, wherein the selection of the color appearance and gamut mapping profiles is done at the OpenColorProfile function.

3. A method according to claim 1, wherein the step of associating a color appearance profile and a gamut mapping profile based on the device model profile comprises assigning a color appearance profile and gamut mapping profile at the create multicolor profile transform function.

4. A method according to claim 1, wherein the step of associating a color appearance profile and a gamut mapping profile based on the device model profile comprises assigning a color appearance profile and gamut mapping profile at the CreateMultiColor transform function.

5. A method according to claim 1, wherein the step of associating a color appearance profile and a gamut mapping profile based on the device model profile comprises dynamically resolving the color appearance profile and the gamut mapping profile at one of the OpenColorProfile function and CreateColor transform function.

6. A method according to claim 5, wherein the device model profile is an ICC profile and the step of associating a color appearance profile and a gamut mapping profile based on the device model profile comprises dynamically resolving the color appearance profile and the gamut mapping profile at the OpenColorProfile function.

7. A method according to claim 5, further comprising the step of:
   assigning a profile handle by obtaining a default color appearance profile and a gamut mapping profile from a default registry.

8. A method according to claim 7, wherein the step of associating a color appearance profile and a gamut mapping profile based on the device model profile comprises dynamically resolving the color appearance profile and the gamut mapping profile at the CreateColor Transform function.

9. A method according to claim 1, wherein the step of associating a color appearance profile and a gamut mapping profile based on the device model profile comprises dynamically resolving the color appearance profile and the gamut mapping profile at the OpenColorProfile function and further comprising the step of:
   selectively overriding a particular color appearance profile and a gamut mapping profile at the CreateColor transform function.

10. A method for selectively setting color appearance model and gamut map model defaults in a color management system that transforms colors from a first color space to a second color space, the method comprising:
    determining a profile associated with the second color space;
    associating a color appearance profile and a gamut mapping profile based on the profile; and
    setting rendering intents and their defaults from one of a source profile rendering intent, a destination profile rendering intent, and a CreateMultiColorProfileTransform intent parameter list.

11. The method of claim 10, further comprising selecting the color appearance and gamut mapping profiles.

12. The method of claim 10, wherein the associating a color appearance profile and a gamut mapping profile based on the profile comprises assigning the color appearance profile and the gamut mapping profile at a Create multicolor profile transform function.

13. The method of claim 10, wherein the associating a color appearance profile and a gamut mapping profile based on the profile comprises dynamically resolving the color appearance profile and the gamut mapping profile at one of an OpenColorProfile function and a CreateColor transform function.

14. The method of claim 10, wherein the profile is an ICC profile and the associating a color appearance profile and a gamut mapping profile based on the profile comprises dynamically resolving the color appearance profile and the gamut mapping profile at an OpenColorProfile function.

15. The method of claim 14, further comprising assigning a profile handle by obtaining a default color appearance profile and a default gamut mapping profile from a default registry.

16. The method of claim 14, wherein the associating a color appearance profile and a gamut mapping profile based on the profile of the second color space comprises dynamically resolving the color appearance profile and the gamut mapping profile at a CreateColor Transform function.

17. The method of claim 10, wherein the associating a color appearance profile and a gamut mapping profile based on the profile comprises dynamically resolving the color appearance profile and the gamut mapping profile at an OpenColorProfile function and further comprises selectively overriding a particular color appearance profile and a particular gamut mapping profile at a CreateColor transform function.

* * * * *

UNITED STATES PATENT AND TRADEMARK OFFICE
CERTIFICATE OF CORRECTION

PATENT NO. : 7,667,872 B2 Page 1 of 1
APPLICATION NO. : 11/273155
DATED : February 23, 2010
INVENTOR(S) : Presley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1136 days.

Signed and Sealed this

Seventh Day of December, 2010

David J. Kappos
*Director of the United States Patent and Trademark Office*